US005958174A

United States Patent [19]

Ramsberg et al.

[11] Patent Number: 5,958,174

[45] Date of Patent: Sep. 28, 1999

[54] MANUFACTURE OF TELEPHONE DEBIT CARDS

[75] Inventors: E. Douglas Ramsberg, Thurmont, Md.; Gerald C. Krahn, Bursche Prairie, Wash.; Jeffrey S. Walter, Thurmont, Md.; Ralph F. Irelan, Emmitsburg, Md.; John L. Wantz, Thurmont, Md.; Eric Patterson, Waynesboro, Pa.

[73] Assignee: Moore Business Forms, Inc., Grand Island, N.Y.

[21] Appl. No.: 08/827,069

[22] Filed: Mar. 26, 1997

Related U.S. Application Data

[62] Division of application No. 08/468,472, Jun. 6, 1995, Pat. No. 5,650,209.

[51] Int. Cl.[6] .................................................... B32B 31/00

[52] U.S. Cl. .......................... 156/277; 156/324; 156/292

[58] Field of Search .................................... 156/291, 324, 156/277

[56] References Cited

U.S. PATENT DOCUMENTS

| | | | |
|---|---|---|---|
| 3,184,150 | 5/1965 | Hubbard | 229/92.1 |
| 3,721,339 | 3/1973 | Seyer | 206/557 |
| 3,872,966 | 3/1975 | Gordon et al. | 206/45.31 |
| 4,397,417 | 8/1983 | Carlson | 229/92.3 |
| 4,801,076 | 1/1989 | Schoenleber et al. | 229/92.7 |
| 4,982,894 | 1/1991 | Schmidt | 229/69 |
| 5,031,382 | 7/1991 | Boyle | 53/411 |
| 5,048,748 | 9/1991 | Martin | 229/92.1 |
| 5,131,686 | 7/1992 | Carlson | 282/75 |
| 5,427,832 | 6/1995 | Longtin | 428/43 |

*Primary Examiner*—Francis J. Lorin
*Attorney, Agent, or Firm*—Nixon & Vanderhye, P.C.

[57] ABSTRACT

A card package assembly and method of manufacture thereof allow simple and inexpensive production of desirable products, particularly useful for telephone debit cards. A web of card stock is imaged on both first and second faces with indicia (preferably variable and non-variable), and the faces are spot coated with plastic at spaced locations equal to the length of card package ultimately separated from the web. A card is formed from or out of each of the spot coated plastic locations, by die cutting, or with lines of weakness such as perforations. The form is narrower at the card, and adhesive patterns outside the card portions hold other panels of the package together once folded over to sandwich the card between other panels. The cards may be produced from a web one package wide, or from a web two or even more packages wide. A bang tail is preferably provided connected to the card, and of the same width, with a perforation separating the bang tail from the card and coupon indicia imaged on the bang tail.

16 Claims, 7 Drawing Sheets

MANUFACTURE OF TELEPHONE DEBIT CARDS

This is a Divisional of application Ser. No. 08/468,472, filed Jun. 6, 1995, now U.S. Pat. No. 5,650,209.

BACKGROUND AND SUMMARY OF THE INVENTION

There are increasing uses of cards for many purposes in modern society. Credit cards, identification cards, debit cards, and the like are commonly used in a wide variety of industries and areas of commerce. It is desirable to be able to produce such cards in a simple and inexpensive manner, and to package the cards so that they have confidentiality until delivered to the ultimate user, yet are easy to handle and to open by the ultimate user. Increasing need has been found in this regard in the production of telephone debit cards, which entitle the purchaser to a certain number of units (typically in minutes) of long distance communication.

According to the present invention a card package assembly, and a method of manufacture thereof, are provided which do allow the simple and inexpensive production of cards for a wide variety of purposes (including telephone debit cards), which cards are as durable as are necessary to perform their intended function, but are inexpensive. The package produced according to the invention has a high degree of confidentiality, yet is quickly and easily opened and in a manner that requires destruction so that it can be readily observed if the package has been tampered with.

According to one aspect of the present invention a card package assembly is provided. The assembly comprises the following elements: A sheet of card stock material having first and second end edges; first and second faces; and first, second, and third panels, the first and second panels having parallel first and second side edges spaced from each other a first distance, and the third panel having third and fourth side edges spaced from each other a second distance, less than the first distance. A card portion of the third panel having first and second faces, each of the faces coated with plastic and having indicia imaged thereon. Readily detachable connection means connecting the card portion to other portions of the sheet of card stock, the card portion containing a card. First and second adhesive patterns disposed on at least one of the first and second panels adjacent the first and second side edges thereof and spaced from each other a third distance, greater than the second distance. An opening-facilitating tear strip formed in the first panel at or near the first end edge. And the first and second panels folded with respect to the third panel so that the card portion is sandwiched between the first and second panels and held in that position by the first and second adhesive patterns holding the first and second panels together exteriorly of the card portion.

The tear strip when at the first end edge, or even if merely adjacent the end edge, may further comprise a pattern of plastic coating on the second face thereof to reinforce the strip. A third adhesive pattern may be provided on the first face of the third panel for cooperating with the second face of the tear strip to assist in holding the card portion sandwiched between the first and second panels, the plastic coating of the tear strip facilitating release of the third adhesive pattern from the tear strip. Preferably a bang tail portion is also provided, forming a fourth panel releasably connected to the third panel (as by a perforation or other line of weakness). The bang tail has side edges spaced from each other substantially the second distance, and typically includes coupon indicia imaged on its first face.

The readily detachable connection means may comprise a die cut, or may comprise lines of weakness, such as a line of weakness between the card portion and another portion of the third panel, and between the card portion and the bang tail.

The tear strip may be provided adjacent the first end edge, and an adhesive strip provided between the tear strip and the first end edge. The tear strip is then formed in a portion of the first panel folded over the second panel so that the adhesive strip attaches the first panel second face to the second panel first face. Also, the package assembly may comprise first and second lines of weakness formed in the first panel parallel to the side edges and spaced from each other a distance approximately equal to the third distance, and the panels may be separated by fold lines. Colored indicia may be imaged on the first and second panel first faces, including what type of card is enclosed (e.g. a representation of a telephone debit card, such as shown in copending application Ser. No. 08/155,759 filed Nov. 23, 1993). Where the card comprises a telephone debit card, it has telephone debit card indicia imaged on the first and second faces thereof.

According to another aspect of the present invention a method of making a card package assembly from a web of card stock having first and second panel side edges spaced from each other a first distance, and first and second faces, is provided. The method comprises the following steps: (a) Imaging the web first and second faces with indicia. (b) Spot coating the web first and second faces with plastic at spaced locations having a spacing approximately equal to the length of a card package form ultimately to be separated from the web. (c) Die cutting marginal portions from the web at the spot coated plastic locations so that at the spot coated plastic portions the web first and second edges are spaced from each other a second distance, less than the first distance. (d) Forming a card from or out of each of the spot coated plastic locations. (e) Providing adhesive patterns on the second face of the web adjacent the first and second side edges and spaced from each other a third distance greater than the second distance. (f) Separating the web into individual card package forms. (g) Folding each card package form to sandwich the card between other portions thereof so that the card is not visible and so that the adhesive patterns are positioned to hold the form together. And (h) activating the adhesive to form a final card package assembly. The cards can be produced from a web one card wide, two cards wide, or even more than two cards wide; that is, steps (a) through (f) may be practiced to produce card package assemblies side by side from the web.

There may also be the further step, before step (g), of forming a tear strip for each card package formed adjacent a first end edge thereof remote from the card. There may also be the step of coating the tear strip with a strip of plastic to reinforce it, and of providing another adhesive pattern connecting portions of the form together at or adjacent the tear strip. The step of providing another adhesive pattern is typically practiced to provide the pattern on the second face of the card stock between the tear strip and the first end edge thereof, and most desirably there is still the further step of forming a bang tail connected to the card by a line of weakness (and step (a) is practiced to image coupon indicia on the first face of the bang tail).

It is a primary object of the present invention to provide a simple yet effective card package assembly (and method of manufacture thereof which provides security and confidentiality of the card yet allows ready access thereto. This and other objects of the invention will become clear from an inspection of a detailed description of the invention and of the appended claims.

DETAILED DESCRIPTION OF THE DRAWINGS

Figure 1:
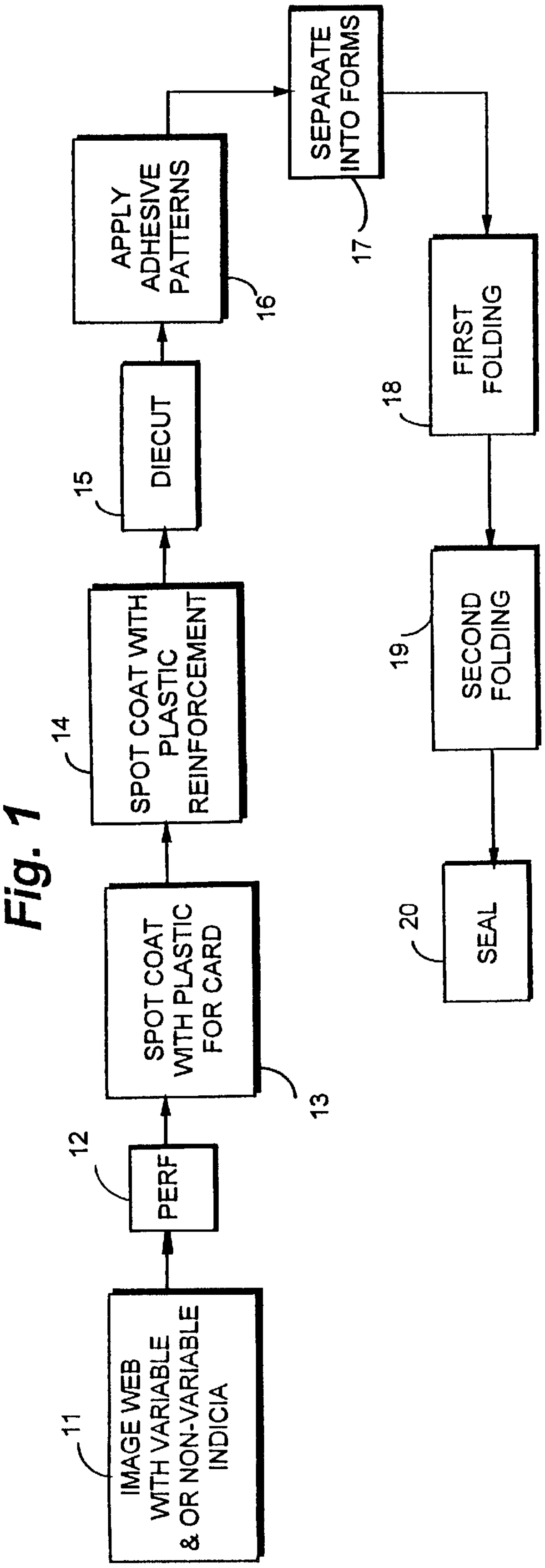
FIG. 1 is a schematic, diagrammatic, illustration of exemplary method steps that may be utilized to practice the method according to the present invention.
Figure 4:
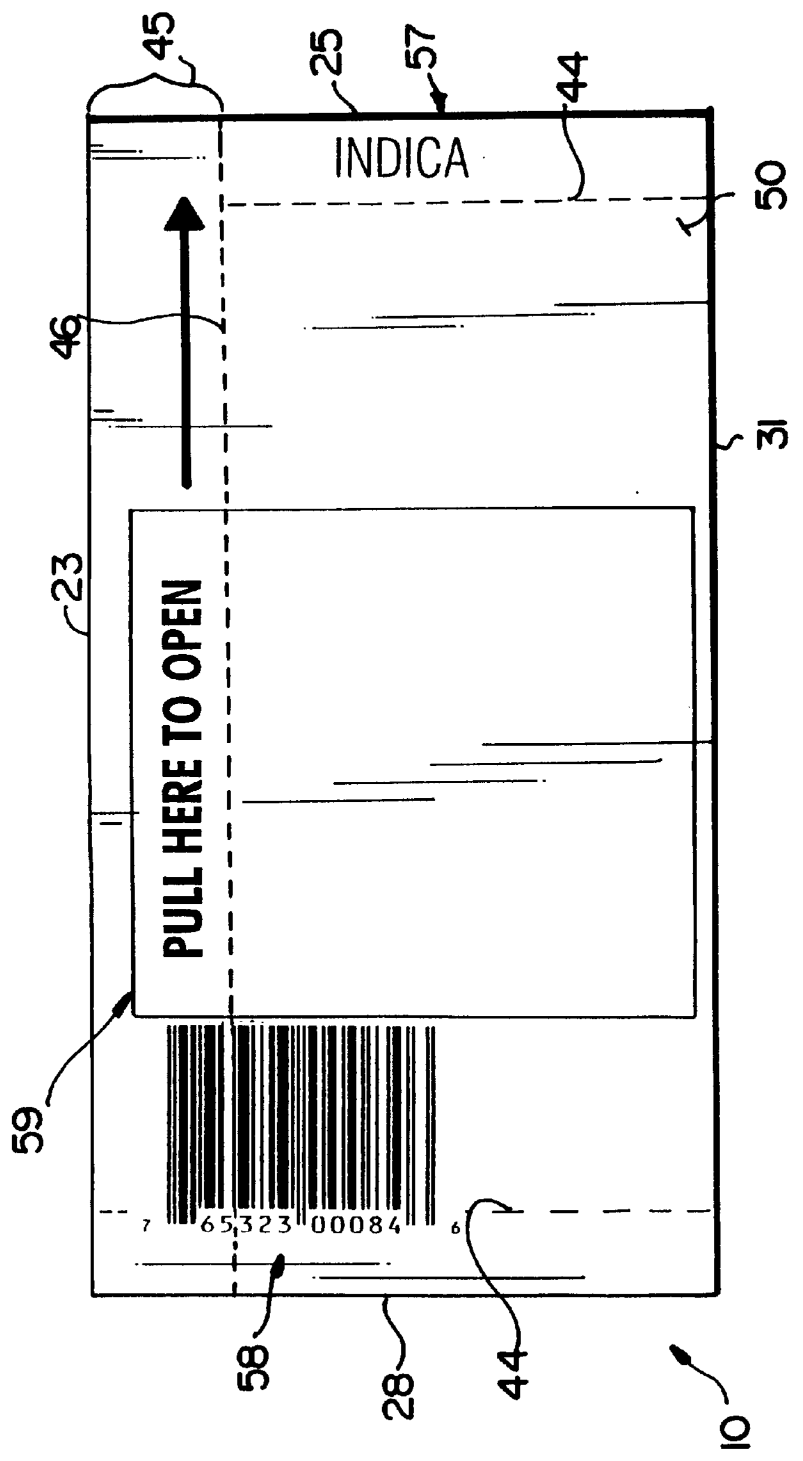
FIG. 4 is a top plan view of a completed card package according to the present invention.

FIG. 1 schematically illustrates an exemplary method of production of a card package assembly—such as the card package assembly 10 illustrated in FIG. 4—according to the present invention. Any type of card may be packaged thereby, such as a credit card, identification card, debit card, or the like, but the method of the invention is particularly suited for the manufacture of telephone debit cards and like cards that are desirably made of card stock material (though plastic coated for better durability) and which have a very finite life (that is, not designed to be as durable as conventional credit cards). While FIG. 1 illustrates various steps in a particular sequence, that is for the purpose of illustration only, and a wide variety of different sequences can be provided.

The first box illustrated in FIG. 1, box 11, schematically illustrates imaging a card stock web with variable and/or non-variable indicia, typically imaging both first and second faces of the web. The web is advanced continuously during manufacture, and preferably is 24–28 pound card stock material, or 60 pound paper board mat. The imaging in step 11 is typically practiced utilizing MIDAX® imaging equipment, although a wide variety of other imaging equipment (including conventional printing equipment) may be utilized. At some stage perforations or other lines of weakness are formed in the web, as illustrated schematically by box 12 in FIG. 1.

In order to provide a durable card from the card stock web, as indicated by box 13 in FIG. 1, the web is spot coated (preferably on both first and second faces thereof) with plastic (such as Mylar®), the coating being provided over the entire area from which the card will be formed. Also, according to the present invention—as illustrated by box 14 in FIG. 1—there may be spot coating with plastic reinforcement for a tear strip which facilitates opening the packages. There are many times where prior art packages suffer from not being able to completely remove the tear strip at the perforations or ties because they are too strong and, therefore, require the user to rip open the package, which can lead to destruction of operating instructions, a verification code, or in extreme circumstances even the card itself. By providing the plastic reinforcement stage 14 (in which Mylar® or a like plastic coated typically just on the second face of a web) this problem is avoided.

Also, during the manufacturing process there is a die cutting stage illustrated schematically at 15 in FIG. 1. The die cutting may in either a one or multi-stage process form a card from the web, and remove side margins (chips) from the card, to facilitate folding of the card stock and the adhesive attachment of the card panels together. As indicated at stage 16, appropriate adhesive patterns are applied to the card stock where desired, e.g. the second face of the web straddling the third panel of the web which contains the card, to hold first and second panels of the web together when they are folded over into operative association with each other.

Ultimately this web is separated into individual forms for forming individual card packages, as indicated schematically at 17 in FIG. 1. The separation may be done by bursting (if perforations or other lines of weakness are provided between the individual forms), or by conventional cutting processes. Once the individual forms are formed, there typically is a first folding step 18 in which the third panel—containing the card—is folded over with respect to the first and second panels, and then a second folding stage 19 in which the first and second panels are folded together so as to sandwich the card (and typically bang tail) between them and to bring the adhesive portions into operative association with each other. Then there is the step 20 of activating the adhesive to seal the package into its final configuration 10, as illustrated in FIG. 4. The sealing stage 20 will depend upon the particulars of the adhesive patterns applied at step 16. Typically, pressure sensitive adhesive or cohesive is utilized, and sealing is accomplished by providing pressure (such as by utilizing the conventional Moore Business Forms, Lake Forest, Ill., pressure seal equipment), although heat seal adhesive, rewettable adhesive, and other types of adhesive are also suited for the process according to the present invention.

Figure 2:
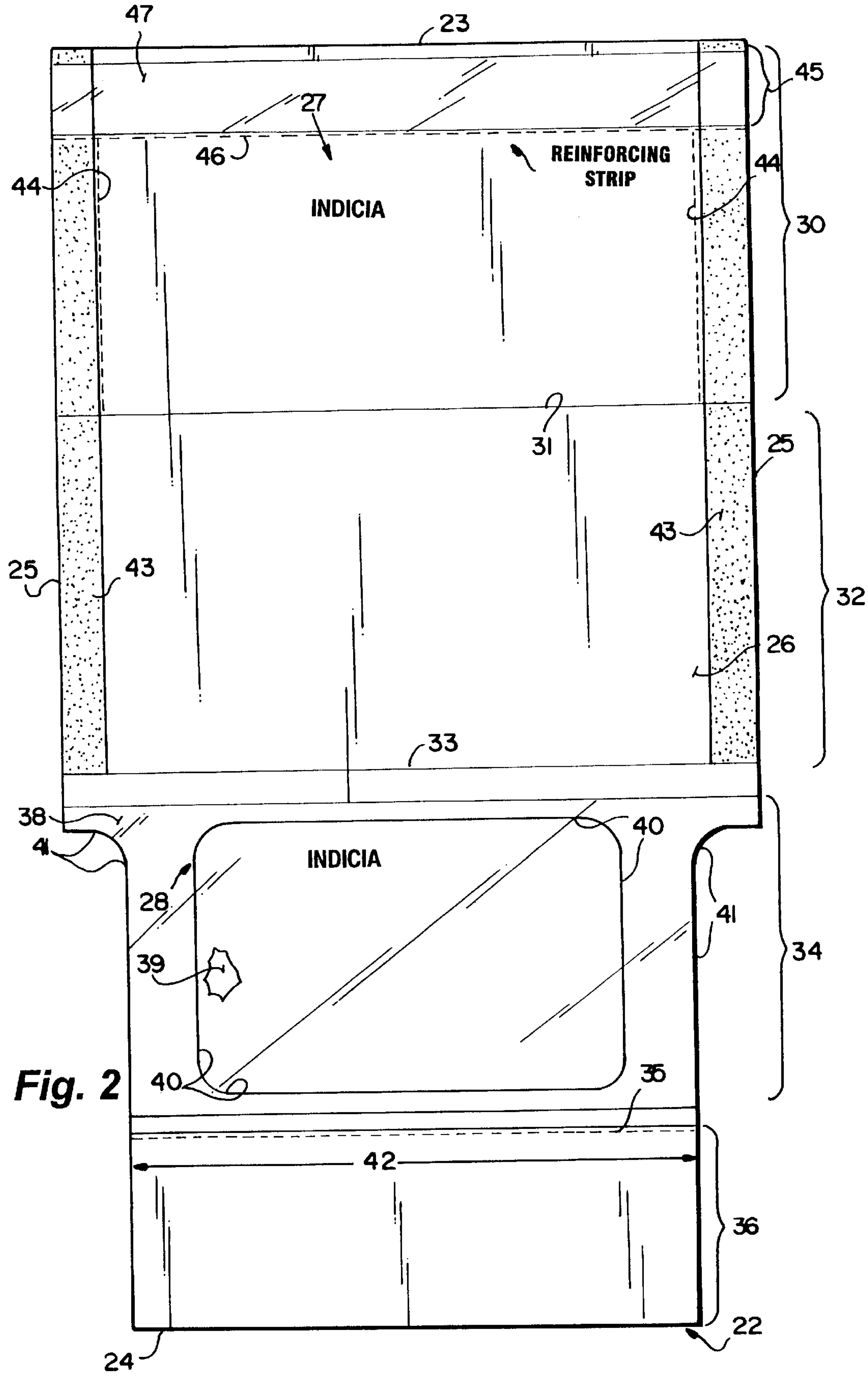
FIG. 2 is a top plan view of the second face of an intermediate form, made from a web, prior to folding the form into an exemplary card package according to the present invention.
Figure 3:
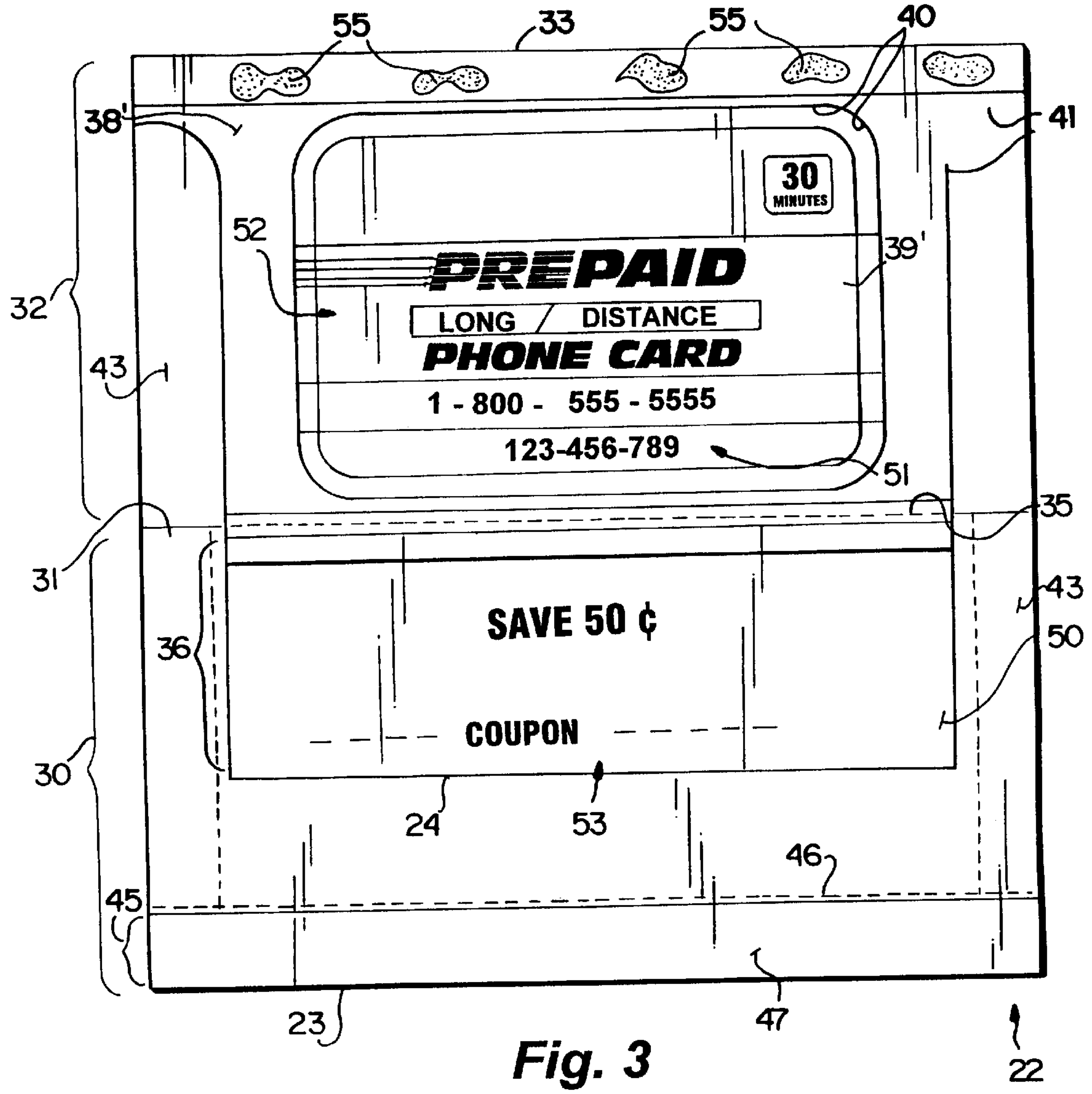
FIG. 3 is a view like that of FIG. 2 only showing first and second panels having the third panel and bang tail folded thereover.

FIGS. 2 through 4 illustrate intermediate components in the method of manufacturing the ultimate card package assembly 10 of FIG. 4 according to a first embodiment of the invention. FIG. 2 illustrates a form 22 which has been separated from the web having a first edge end 23, a second end edge 24, and side edges 25. The edges 23, 24 are parallel to each other and transverse to the parallel side edges 25. FIG. 2 illustrates a second face 26 of the form 22 which typically has various non-variable indicia 27, 28, for example, thereon.

The form 22 in this embodiment includes at least three panels, and typically a fourth panel (which comprises a bang tail). A first panel 30 is between the end edge 23 and the fold line 31, the second panel 32 is between fold lines 31, 33, and the third panel 34 is between fold lines 33, 35. Alternatively, the bang tail—fourth panel 36—may be eliminated and then the end of the third panel 34 will be the end edge 24. However, in the preferred embodiment illustrated in FIG. 2, the bang tail 36 is formed between fold line 35 and the end edge 24. The fold lines 31, 33, 35 may be score lines, lines of weakness, or the like. In the embodiment illustrated the lines 31, 33 are score lines, while the line 35 is a perforation line so that the bang tail 36 is a separate distinct element from the third panel 34.

FIG. 2 illustrates a plastic (e.g. Mylar®) coating 38 over at least the majority of the third panel 34. In the embodiment illustrated in FIG. 2, the Mylar® coating 38 is essentially coterminous with the fold line 33, and just above the perforation line 35. In the third panel 34 is the card 39, which is die cut—as indicated by die cut edges 40—from the card stock forming the form 22, the die cut edges 40 comprising readily detachable connection means. Typically the indicia 28 has been applied before the plastic coating 38.

During the same die cutting operation that made the cuts 40, preferably the marginal portions of the third panel 34 and the bang tail 36 are also removed, as indicated by the "chip" or side cutout 41. That means that the third panel (and the bang tail) are spaced from each other a distance 42, which less than the spacing between the side edges 25.

FIG. 2 also shows adhesive patterns 43 that are provided adjacent the side edges 25 in at least one of the first and second panels 30, 32, for ultimately holding the panels 30, 32 together. Adhesive patterns 43 may comprise continuous strips (as illustrated), discontinuous strips, dots, or other patterns, and may be of permanent adhesive or other adhesive types, and may be pressure sensitive, rewettable, or heat activated.

Also, there preferably are lines of weakness 44 formed in the first panel 30 parallel to the side edges 25 and on the opposite side of the side edges 25 from the adhesive patterns 43. The lines of weakness 44 allow ready detachment of portions of the first panel to expose the card 39. Also, a tear strip 45 is preferably formed in the first panel 30. In the embodiment illustrated in FIG. 2, the tear strip 45 is formed at the end edge 23, being formed by the end edge 23 and the lines of weakness 46 (typically perforation lines, although they may be die cut ties). According to the invention it is desirable to reinforce the tear strip 45, and this is simply and easily accomplished by providing a plastic (e.g. Mylar®) coating 47 on the second face 26 of the form 22 at the tear strip 45.

FIG. 3 illustrates the form 22 of FIG. 2 once the third panel 34 and the bang tail 36 have been folded over so that the second faces 26 thereof come into face to face engagement with the second faces of the panels 30, 32. FIG. 3 thus shows the first face 50 of the form 22, which first face 50 typically has variable indicia thereon, such as the indicia 51 formed on the card 39, and other variable indicia, as well as non-variable indicia 52. FIG. 3 illustrates that there is a plastic coating 38', corresponding to the coating 38, on the first face 50 covering at least the majority of the third panel 34, and of course the card 39 so as to impart greater longevity and tear resistance to the card 39. FIG. 3 also shows coupon indicia 53 which has been imaged on the first face 50 of the bang tail 36. FIG. 3 also shows the adhesive patterns 43 ready to be moved into alignment with each other.

FIG. 3 further shows a third adhesive pattern, in this case the spaced dots of adhesive 55, which are provided on the third panel 34 adjacent the fold line 33 (typically in a portion thereof not completely covered by the Mylar® coating 38'). The adhesive 55 will engage the plastic coating 47 of the tear strip 45, and facilitate holding of the final card package assembly 10 together, although it will not significantly interfere with the removal of the tear strip and opening of the package 10.

FIG. 4 shows the intermediate of FIG. 3 once it has been folded about the lines 31, 35 so as to bring the card 39 into a position where it is sandwiched between the panels 30, 32 and the adhesive patterns 43 hold the panels 30, 32 together. FIG. 4 shows the first face 50 of the first panel 30, which typically has colored indicia 57 thereon, as well as a wide variety of other indicia, such as the bar code 58, and the opening instructions 59.

To open the package 10 one merely grasps the tear strip 45 —e.g., adjacent the right hand edge thereof—and pulls to the left as seen in FIG. 4. Because the tear strip 45 is reinforced with plastic coating 47, it does not have a tendency to disintegrate, but rather a clean tear is provided along the perforation line 46, the adhesive dots 55 not significantly retarding the opening action. Then there is ready access to the interior of the package 10 without damaging the card 39 or instructions which are contained within the package 10. The marginal portions are also easily separated from the main body of the first panel 30 by tearing along the perforation lines 44. The card 39 that is accessed is easily removed from the rest of the form 22 merely by pushing it, easily separating it from the plane of the third panel 34 at the die cuts 40. While the card 39 is of card stock, because of the plastic coatings 38, 38' it will withstand well a sufficient period of use for its purposes (e.g. for example as a telephone debit card).

Figure 5:
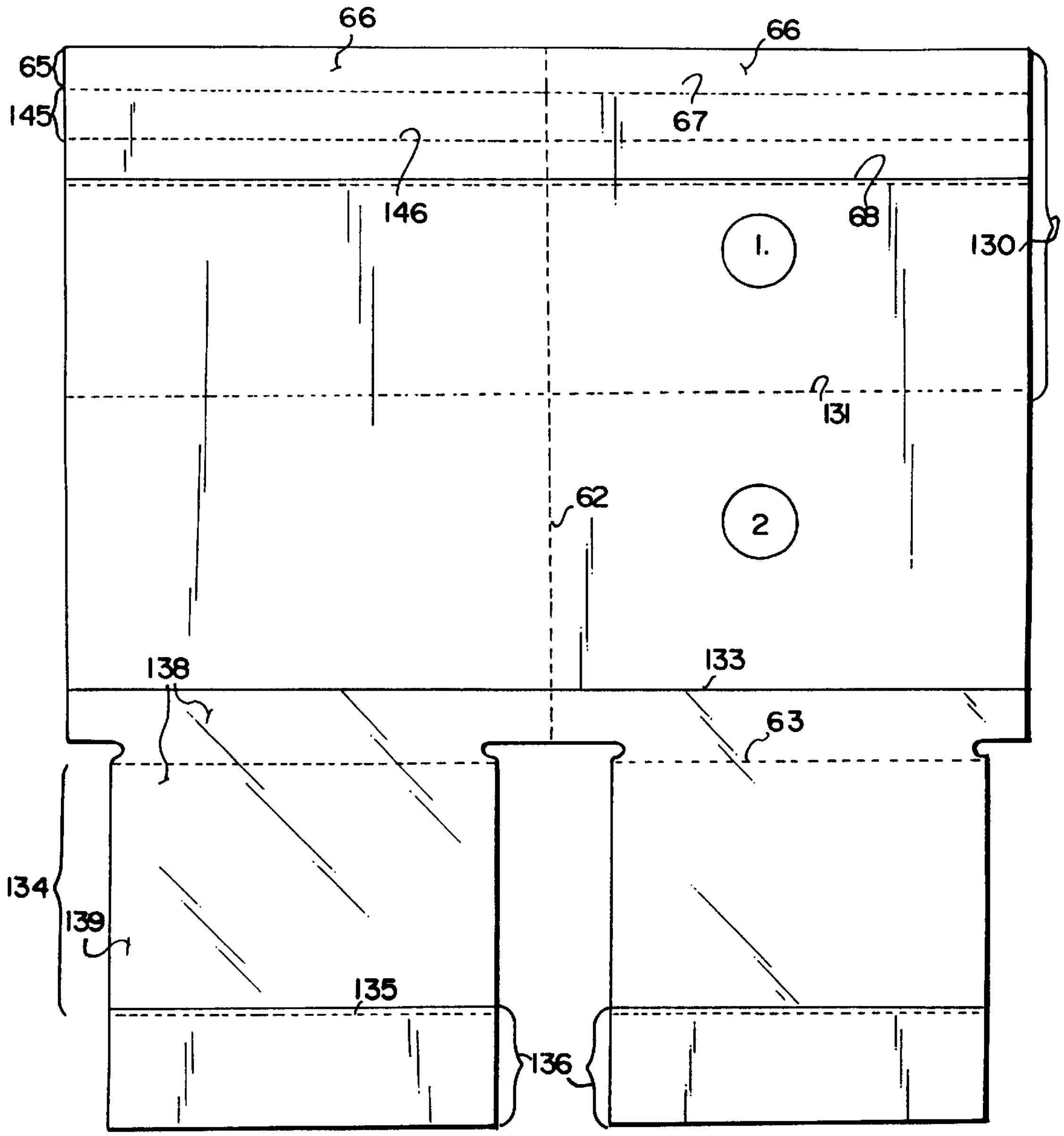
FIG. 5 is a view like that of FIG. 2 only for a second embodiment of an intermediate in the production of a card package assembly according to the invention.
Figure 6:
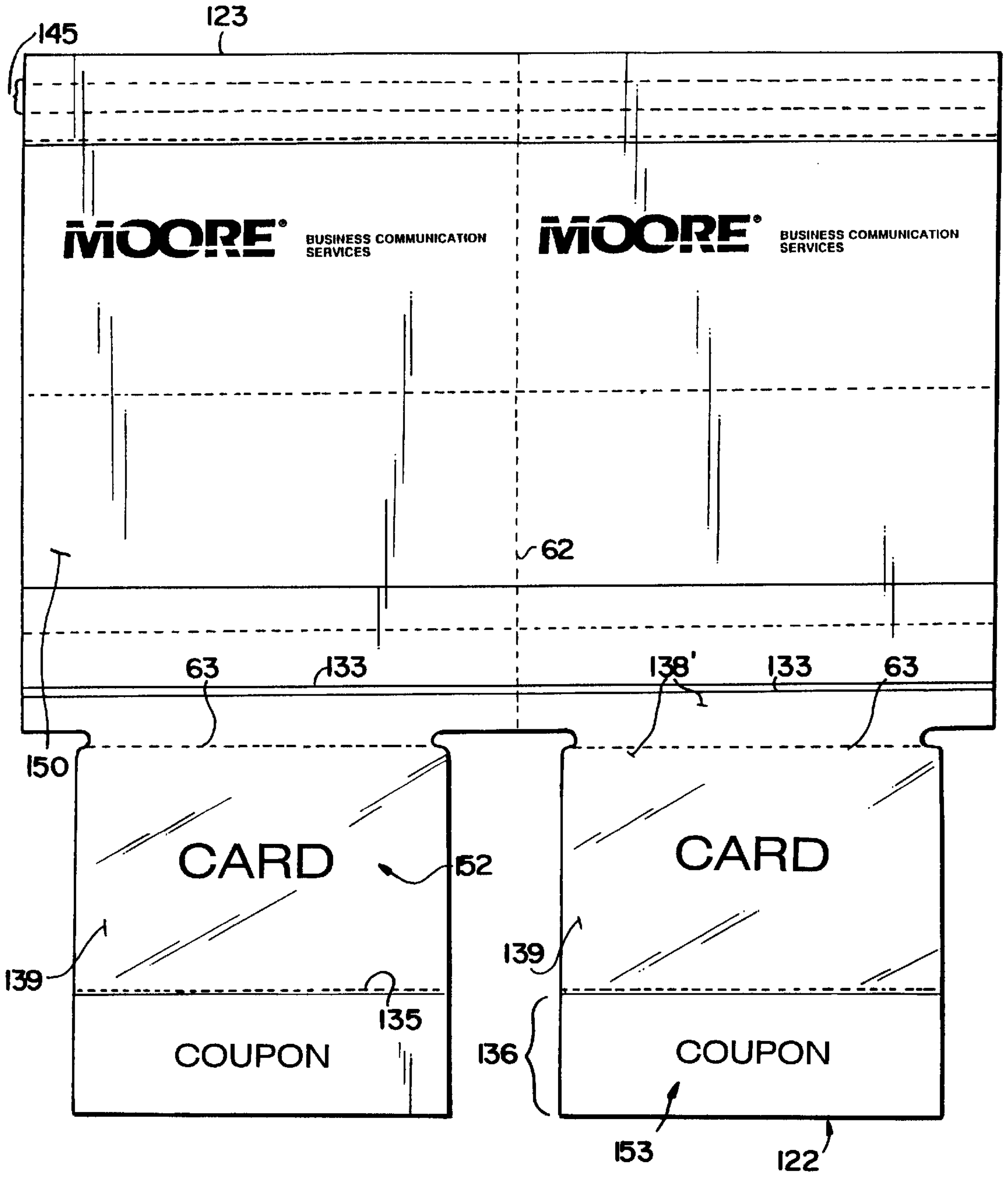
FIG. 6 is a view like that of FIG. 5 only of the opposite face of the intermediate.
Figure 7:
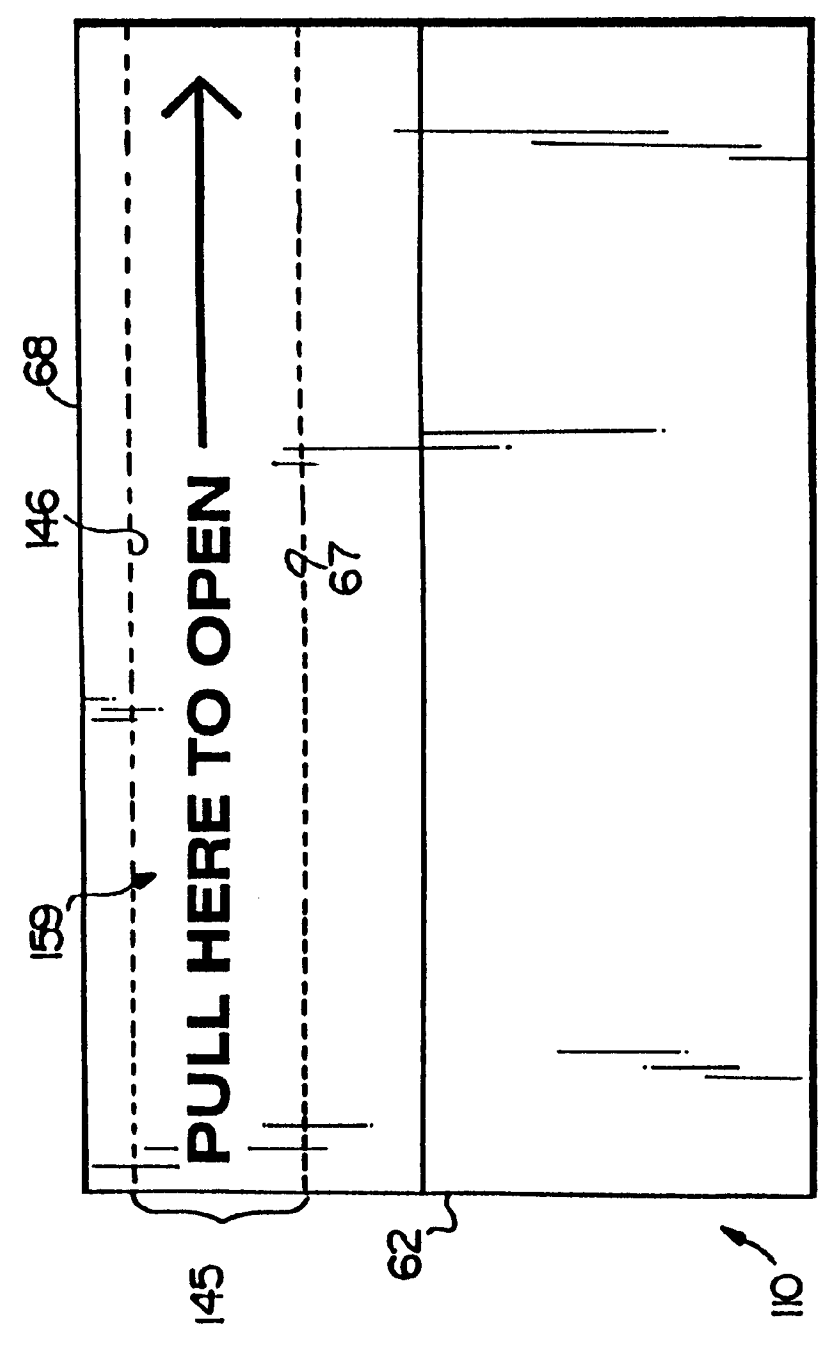
FIG. 7 is a plan view of a card package assembly made from the intermediate of FIGS. 5 and 6.

FIGS. 5 through 7 illustrate a second embodiment according to the present invention. In this embodiment the same basic attributes are obtained only in a slightly different manner. In this embodiment components comparable to those in the FIGS. 2 through 4 embodiment are shown by the same reference numeral only preceded by a "1", therefore all of the individual components will not be described but reference is made to the description of FIGS. 2 through 4.

The major differences between the embodiment of FIGS. 5 through 7 and that of FIGS. 2 through 4 are in the particular manner of construction of the card 39, 139, and the particular way that sealing is effected and where the tear strip 45, 145 is located. Also, as clearly seen in FIGS. 5 and 6, instead of the package 110 being constructed from a web one card package 110 wide, it is constructed from a web two card packages wide (although more than two card packages wide can also be provided). A longitudinal line of weakness 62 is provided between the card assemblies 110. In this embodiment instead of the readily detachable connection means for connecting the card portion to the other portions of the card stock comprising the die cuts 40, the readily detachable connection means comprises a perforation line 63, or other line of weakness. Of course, a wide variety of other readily detachable connection means are also possible, including adhesively connected components, spaced ties, overlapping static electricity clinging elements, or the like.

In the FIGS. 5 through 7 embodiment instead of the tear strip 145 being provided substantially at the edge 123, it is spaced from the edge 123 by an adhesive strip 65, the adhesive strip 65 having adhesive—as illustrated at 66 in FIG. 5—thereon. While the tear strip 145 is not illustrated in FIG. 5 with a plastic coating, it typically does have a plastic coating like the coating 47 illustrated in FIG. 2. The tear strip 145 is separated from the adhesive strip 65 by a perforation or other line of weakness 67. There is also a fold line 68 which allows the first panel 130 to be folded so that the adhesive 66 comes into contact with the first face 150 of the second panel 132. In this embodiment opening of the package 110 is provided by grasping the tear strip 145 at the right (as seen in FIG. 7) and tearing, the separation taking place along the perforation lines 67, 146. While the adhesive strips comparable to the strips 43 are not shown in FIGS. 5 and 6 merely for clarity of illustration, they are preferably provided.

It will thus be seen that according to the present invention a simple, inexpensive, and easy to open card package assembly (and method of manufacture thereof) has been provided. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent assemblies and methods.

What is claimed is:

1. A method of making a card package assembly from a web of card stock having first and second parallel side edges spaced from each other a first distance, and first and second faces, comprising the steps of:

(a) imaging the web first and second faces with indicia;

(b) spot coating the web first and second faces with plastic at spaced locations having a spacing approximately equal to the length of a card package form ultimately to be separated from the web;

(c) die cutting marginal portions from the web at said spot coated plastic locations so that at said spot coated plastic portions the web first and second edges are spaced from each other a second distance, less than the first distance;

(d) forming a card from or out of each of said spot coated plastic locations;

(e) providing adhesive patterns on the second face of the web adjacent the first and second side edges and spaced from each other a third distance greater than the second distance;

(f) separating the web into individual card package forms;

(g) folding each card package form to sandwich the card between other portions thereof so that the card is not visible and so that the adhesive patterns are positioned to hold the form together; and (h) activating the adhesive to form a final card package assembly.

2. A method as recited in claim 1 wherein steps (a)–(f) are practiced to produce two card package assemblies side by side from the web.

3. A method as recited in claim 1 comprising the further step of forming a tear strip for each card package form adjacent a first end edge thereof remote from the card before step (g).

4. A method as recited in claim 3 comprising the further step of coating the tear strip with a strip of plastic to reinforce it.

5. A method as recited in claim 4 comprising the further step of providing another adhesive pattern connecting portions of the form together at or adjacent the tear strip.

6. A method as recited in claim 5 wherein said step of providing another adhesive pattern is practiced to provide the pattern on the second face of the card stock between the tear strip and the first end edge thereof.

7. A method as recited in claim 1 comprising the further step of forming a bang tail connected to the card by a line of weakness, and wherein step (a) is practiced to image coupon indicia on the first face of the bang tail.

8. A method as recited in claim 2 comprising the further step of forming a tear strip for each card package form adjacent a first end edge thereof remote from the card before step (g).

9. A method as recited in claim 8 comprising the further step of coating the tear strip with a strip of plastic to reinforce it.

10. A method as recited in claim 9 comprising the further step of providing another adhesive pattern connecting portions of the form together at or adjacent the tear strip.

11. A method as recited in claim 10 wherein said step of providing another adhesive pattern is practiced to provide the pattern on the second face of the card stock between the tear strip and the first end edge thereof.

12. A method as recited in claim 2 comprising the further step of forming a bang tail connected to the card by a line of weakness, and wherein step (a) is practiced to image coupon indicia on the first face of the bang tail.

13. A method as recited in claim 3 comprising the further step of forming a bang tail connected to the card by a line of weakness, and wherein step (a) is practiced to image coupon indicia on the first face of the bang tail.

14. A method as recited in claim 4 comprising the further step of forming a bang tail connected to the card by a line of weakness, and wherein step (a) is practiced to image coupon indicia on the first face of the bang tail.

15. A method as recited in claim 5 comprising the further step of forming a bang tail connected to the card by a line of weakness, and wherein step (a) is practiced to image coupon indicia on the first face of the bang tail.

16. A method as recited in claim 6 comprising the further step of forming a bang tail connected to the card by a line of weakness, and wherein step (a) is practiced to image coupon indicia on the first face of the bang tail.

* * * * *